Figure 1:
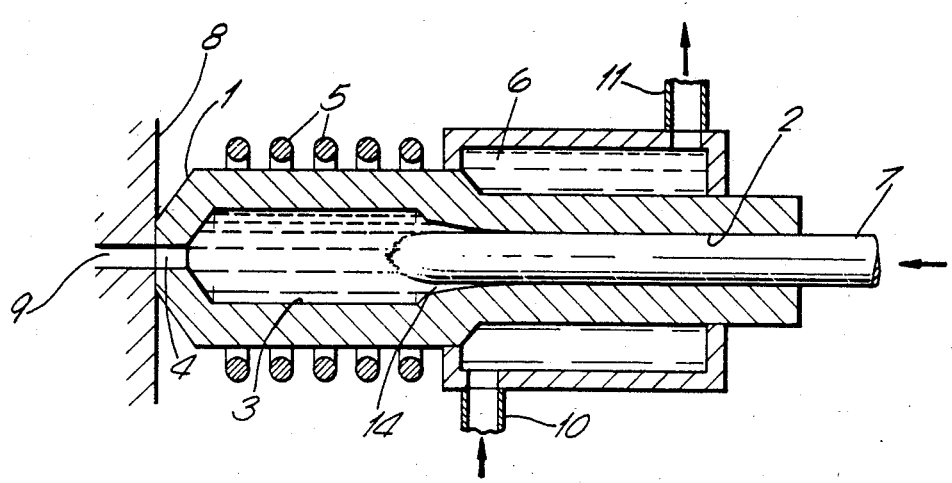

United States Patent [19]

Greenwood et al.

[11] Patent Number: 4,591,476
[45] Date of Patent: May 27, 1986

[54] INJECTION MOULDING CASTING METHOD

[75] Inventors: David Greenwood, Ilmington; Roger J. Smith, Studley, both of England

[73] Assignee: Dynacast International Limited, England

[21] Appl. No.: 687,252

[22] Filed: Dec. 28, 1984

[30] Foreign Application Priority Data

Dec. 30, 1983 [GB] United Kingdom ............... 8334653

[51] Int. Cl.⁴ .............................................. B29C 45/18
[52] U.S. Cl. .................................. 264/328.14; 264/280; 264/328.1
[58] Field of Search ...................... 264/280, 320, 328.1, 264/328.4, 328.5, 328.14, 328.17; 425/376 R, 392, 398, 550, 551, DIG. 228

[56] References Cited

U.S. PATENT DOCUMENTS 2,689,376  9/1954  Wacker ........................... 264/328.17
3,989,793  11/1976  Hertel et al. ...................... 264/328.4

FOREIGN PATENT DOCUMENTS 2120649  12/1983  United Kingdom ........... 264/328.17

Primary Examiner—Donald Czaja
Assistant Examiner—V. Fischbach
Attorney, Agent, or Firm—Larson and Taylor

[57] ABSTRACT

A method of injection moulding or casting comprises forcing a solid bar of the material to be moulded or cast as a plunger into a closed heating chamber having a discharge opening. The heating chamber is maintained at a temperature above the melting or plasticizing temperature of the moulding or casting material so that the leading end of the bar on entering the chamber melts or plasticizes therein and displaces molten or plasticized material from the chamber through the discharge opening. Apparatus comprises a body member formed with a heating chamber and a straight passage leading into the chamber, a plunger formed of the material to be moulded or cast being slidable in the passage. A thermal barrier may divide the passage into two successive portions.

4 Claims, 2 Drawing Figures

U.S. Patent     May 27, 1986     4,591,476

INJECTION MOULDING CASTING METHOD

This invention relates to a method of injection moulding and casting and to apparatus for performing the method.

Methods of injection moulding and casting of metals and non-metals are already well known.

Known methods and apparatus make use of pumping devices having mechanical pumps for pumping and metering the liquefied moulding or casting material. Such known apparatus, operating as it does at the liquidus temperature of the moulding or casting material at which many of the moulding or casting materials are highly corrosive, are difficult to seal, particularly since injection pressures running into several hundred bars are now common, and give much trouble in operation. Such an apparatus is also difficult to start up from cold as the entire pumping device must be externally heated to liquefy the material in the pump.

The art would be considerably advanced if all pumping mechanism as such could be eliminated and it is an object of the invention to provide a method of injection moulding and casting and apparatus for performing the method which dispenses with pumping mechanism as such.

According to the invention a method of injection moulding or casting includes the step of discharging moulding or casting material in a molten or plasticized state under pressure by forcing a solid bar of the material to be moulded or cast as a plunger into a closed heating chamber having a discharge opening and which is maintained at a temperature above the melting or plasticizing temperature of the moulding or casting material so that the leading end of the bar melts or plasticizes therein, the entering bar displacing molten or plasticized material from the chamber through the discharge opening.

The discharge opening may be connectible to the inlet opening of a mould.

The method may include the step of forming a seal around the solid bar by permitting molten or plasticized material to leak back from the heating chamber along the bar and to freeze around the bar whereby to form within the passage a sealing ring of solidified moulding or casting material around the bar.

According to one aspect of the invention a method of injection moulding or casting includes the step of forcing a solid bar of the moulding or casting material through a straight passage of cross-sectional dimensions such that there is a clearance gap between the bar and the passage wall and the bar is a sliding fit in the passage into a closed heating chamber formed with a discharge outlet while the contents of the chamber are heated to a temperature above the melting or plasticizing point of the moulding or casting material and maintaining the bar in the passage at a temperature below the melting or plasticizing point of the moulding or casting material up to a point nearer the chamber than the point to which molten or plasticized material from the heating chamber can penetrate by leakage in the reverse direction through said clearance gap between the bar of moulding or casting material as a result of pressure in the heating chamber.

According to another aspect of the invention a method of injection moulding or casting by forcing a bar of moulding or casting material through a straight passage in which the bar is a sliding fit into a closed heating chamber in which the entering end of the bar is progressively melted or plasticized includes the step of forming a seal against leakage of moulding or casting material between the bar and the passage by setting the temperature conditions such that the portion of the passage adjacent the heating chamber is maintained hot enough to permit molten or plasticized moulding or casting material to leak into the clearance gap between the bar and the passage as a result of the moulding or casting pressure in the heating chamber and maintaining the portion of the passage more remote from the heating chamber at a temperature below the melting or plasticization point of the casting or moulding material up to a position nearer the heating chamber than the leakage material from the chamber can reach.

The portion of the passage adjacent to and entering the heating chamber may be divergent in the direction towards the chamber.

The method of the invention may include the feature of maintaining a steep temperature gradient between the portion of the passage maintained at a temperature above the melting or plasticizing point of the moulding or casting material and the portion of the passage maintained at a temperature below the melting or plasticizing point of the moulding or casting material.

The point when the steep temperature gradient occurs may be located between the ends of the divergent portion of the passage.

The steep temperature gradient may be produced by means of a thermal barrier located between the two portions of the passage at the point where the steep thermal gradient is to occur.

The temperature of the material in the heating chamber may be such that the material therein is in a molten state or a plastic state. The expression molten is to be understood as including a slurry state.

Apparatus for performing the method of the invention may comprise a body member formed with a straight passage debouching into a closed heating chamber formed with a discharge opening, heating means for heating material within the heating chamber, cooling means for cooling the portion of the body member formed with the passage and a plunger formed as a bar of the material to be moulded or cast is a sliding fit in the passage.

The portion of the passage entering the heating chamber may be divergent in the direction towards the heating chamber.

The body member may be in two portions which are connected to one another in a plane substantially normal to the axis of the passage. Where the passage is formed with a divergent portion the plane may intersect the passage at a position between the ends of the divergent portion.

The two body portions may be connected to one another by way of a thermal barrier which may comprise at least one sheet of insulating material or several thin sheets of metal.

The walls of the passage, the melting chamber and the discharge opening may be coated, for example chemically or electrically, with corrosion-resistant material such as chromium or tantalum.

The portion of the body containing the chamber may be surrounded by induction heating coils and the portion of the body containing the passage may be surrounded by a jacket arranged to contain a coolant such as water.

A metal thermal barrier may also be chosen to function as a screen against induction heating effects arising in the portion of the body portion intended to be kept cool.

Figure 2:
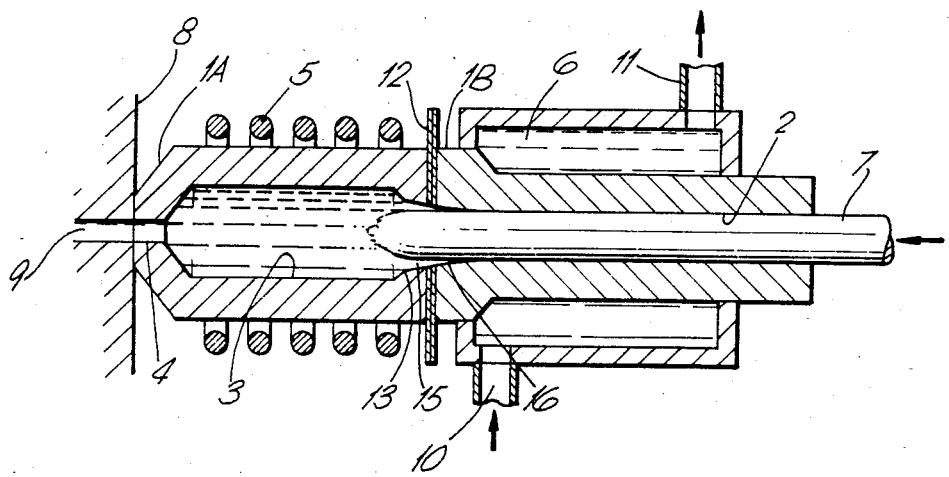

Practical embodiments of apparatus for performing the method of the invention are illustrated in the accompanying diagrammatic drawings in which FIG. 1 illustrates the apparatus in one of its simplest forms and FIG. 2 illustrates an apparatus incorporating a divergent passage and a thermal barrier.

In the drawings 1 denotes a body member formed with a straight passage 2 debouching into a closed heating chamber 3 from which a discharge opening 4 leads. 5 denotes the coils of an induction heating apparatus surrounding the heating chamber 3 so that the induction heating effect is concentrated in material in the melting chamber and 6 denotes a water jacket surrounding the portion of the body member formed with the passage 2. 7 denotes a bar of moulding or casting material arranged to be forced through the passage 2 in which it is a sliding fit into the heating chamber 3. 8 denotes a portion of a mould having an inlet opening 9 aligned with the discharge opening 4 in the body member 1. 10 and 11 denote inlet and discharge passages for coolant to be fed through the jacket 6.

In the construction of FIG. 2 the body member is in two portions 1A and 1B connected to one another in a plane substantially normal to the axis of the passage 2 by way of a thermal barrier 12. The end of the passage 2 which debouches into the heating chamber 3 is divergent towards the heating chamber as indicated at 13, the thermal barrier 12 being located at a position between the ends of the divergent portion 13, In the construction of FIG. 1, 14 denotes molten material from the heating chamber 3 which has leaked into a portion of the passage 2 between the walls of the passage and the bar 7 for a short distance from the heating chamber 3, said leakage being occasioned by the pressure in the heating chamber 3 as the bar 7 is forced into the heating chamber 3 and in the construction of FIG. 2, 15 denotes molten material which has entered the divergent portion 13 of the passage and remained in a molten state up to about the position of the thermal barrier 12 but has then cooled and solidifed in the part of the divergent portion 13 on the other side of the barrier 12 as a solid ring 16.

In practice in the construction of FIG. 1 as the bar 7 is forced forward the leading end entering the closed heating chamber 3 is melted or plasticized in the chamber 3 and as the bar is forced forward into the chamber 3 it acts as a plunger and forces molten or plasticized material from the chamber 3 through the discharge opening 4 and the inlet opening 9 in the mould 8 into the mould cavity. The rise of pressure in the chamber 3 causes some of the molten or plasticized material to enter the clearance gap between the walls of the passage 2 and the bar 7 and penetrate some distance back from the melting chamber 3 until it reaches a portion of the passage which is at a temperature below the melting or plasticizing temperature whereupon it solidifies and forms a sealing ring which surrounds the bar and prevents further leakage and loss of pressure in the chamber 3. In the construction of FIG. 2 the rise of pressure in the heating chamber 3 causes molten or plasticized material from the chamber 3 to enter the divergent portion 13 of the passage and to move along the divergent portion to a point beyond the thermal barrier 12.

The steep temperature gradient across the thermal barrier 12 causes the molten or plasticized material as it crosses the barrier to solidify in the cool portion of the divergent portion 13 and form a sealing ring 16 which fits closely the part of the divergent portion 13 on the cool side of the barrier, i.e. the side remote from the heating chamber 3. As the bar 7 is moved forwardly it will tend to move the solidified ring 16 forwardly with it. Fresh molten material will then flow in behind the ring and progressively form other rings as the bar moves forward so that the sealing action is maintained. As a fresh sealing ring is constantly being formed compensation is continually being made for irregularities in the surface of the bar 7 along the length of the bar so that an efficient seal is maintained. Solidifed material forming previous sealing rings carried forward into the heating chamber 3 are simply remelted and mixed with the material in the heating chamber 3. In the construction of FIG. 2 it is possible to control with a high degree of accuracy the dimensions and the position of the sealing ring.

By the method of the invention high injection pressures may be used without danger of leakage and without the necessity of using apparatus containing movable parts which may leak or give trouble and become corroded by the moulding or casting material since the bar of melting or casting material acts as its own pump.

What we claim is:

1. A method of injection moulding or casting including the step of discharging moulding or casting material in a moulten or plasticized state under pressure from a discharge opening in a closed heating chamber comprising forcing a solid bar of the material to be moulded or cast as a plunger into the closed heating chamber while said chamber is maintained at a temperature above the melting or plasticizing temperature of the moulding or casting material so that the leading end of the bar melts or plasticizes therein, the unmelted portion of the entering bar displacing molten or plasticized material melted off the leading end out from the chamber through the discharge opening and permitting molten or plasticized material to leak back from the heating chamber along the bar to a point on the bar within the passage and freezing the leaked material surrounding the bar at said point whereby to form a sealing ring around the solid bar.

2. A method of injection moulding or casting as claimed in claim 1 in which the portion of the solid bar behind the leading end of the bar is maintained at a temperature below the melting or plasticizing point of the moulding or casting material up to a point nearer the chamber than the point to which molten or plasticized material from the heating chamber can penetrate by leakage in the reverse direction as a result of pressure in the heating chamber.

3. A method of injection moulding or casting as claimed in claim 2 in which the temperature conditions are set to provide that the portion of the passage adjacent the heating chamber is maintained hot enough to permit molten or plasticized moulding or casting material to leak into the clearance gap between the bar and the passage as a result of the moulding or casting pressure in the heating chamber and the portion of the passage more remote from the heating chamber is maintained at a temperature below the melting or plasticization point of the casting or moulding material up to a position nearer the heating chamber than the leakage material from the chamber can reach.

4. A method of injection moulding or casting as claimed in claim 3 in which there is imposed a restriction on heat flow between the portion of the passage held at a temperature above the melting or plasticizing point of the moulding or casting material and the portion of the passage held at a temperature below the melting or plasticizing point of the moulding or casting material.

* * * * *